US010095819B2

(12) United States Patent
Li et al.

(10) Patent No.: US 10,095,819 B2
(45) Date of Patent: Oct. 9, 2018

(54) SIMULATION EXPERIMENT SYSTEM AND SIMULATION METHOD OF ENTIRE NATURAL GAS HYDRATE EXPLOITATION PROCESS

(71) Applicant: GUANGZHOU INSTITUTE OF ENERGY CONVERSION, CHINESE ACADEMY OF SCIENCES, Guangzhou, Guangdong Province (CN)

(72) Inventors: Xiaosen Li, Guangzhou (CN); Yu Zhang, Guangzhou (CN); Yi Wang, Guangzhou (CN); Gang Li, Guangzhou (CN); Zhaoyang Chen, Guangzhou (CN); Chungang Xu, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 591 days.

(21) Appl. No.: 14/765,670

(22) PCT Filed: Dec. 8, 2014

(86) PCT No.: PCT/CN2014/093235
§ 371 (c)(1),
(2) Date: Aug. 4, 2015

(87) PCT Pub. No.: WO2016/078164
PCT Pub. Date: May 26, 2016

(65) Prior Publication Data
US 2016/0357888 A1    Dec. 8, 2016

(30) Foreign Application Priority Data

Nov. 20, 2014    (CN) .......................... 2014 1 0670095

(51) Int. Cl.
*G06F 17/50*    (2006.01)
*E21B 21/08*    (2006.01)
(Continued)

(52) U.S. Cl.
CPC ............ *G06F 17/5009* (2013.01); *E21B 7/00* (2013.01); *E21B 21/08* (2013.01); *E21B 43/01* (2013.01);
(Continued)

(58) Field of Classification Search
CPC ...... G06F 17/5009; E21B 43/01; E21B 21/08; E21B 43/34; E21B 43/16; E21B 43/02; E21B 7/00; E21B 2043/0115
See application file for complete search history.

(56) References Cited

FOREIGN PATENT DOCUMENTS

| CN | 1440832 A | * | 9/2003 |
| CN | 102678090 A | * | 9/2012 |

OTHER PUBLICATIONS

Liu et al., "Experimental Simulation of the Exploitation of Natural Gas Hydrate" Energies 2012, vol. 5, pp. 466-493, ISSN 1996-1073 (2012) (Year: 2012).*
(Continued)

*Primary Examiner* — Aniss Chad
*Assistant Examiner* — Steven W Crabb
(74) *Attorney, Agent, or Firm* — Westerman, Hattori, Daniels & Adrian, LLP

(57) ABSTRACT

A simulation device of an entire natural gas hydrate exploitation process includes a high pressure reaction kettle, a gas-liquid separation device, a hydrate accumulation simulation subsystem simulating a hydrate accumulation process, a hydrate formation drilling simulation subsystem simulating a hydrate formation drilling process, a hydrate exploitation simulation subsystem simulating a hydrate decomposition and gas production process, and a produced gas collecting and processing simulation subsystem simulating a produced gas collecting and processing process. A method for simulating an entire natural gas hydrate exploitation process includes a hydrate accumulation process, a hydrate
(Continued)

formation drilling process, a hydrate exploitation process and a produced gas collecting and processing process. With this simulation device and method, the external environment can be truly simulated, so that the authenticity and accuracy are better, and the entire natural gas hydrate exploitation process is continuously simulated and comprehensively evaluated to provide guidance for natural gas hydrate exploitation.

4 Claims, 1 Drawing Sheet

(51) Int. Cl.
*E21B 43/16* (2006.01)
*E21B 43/24* (2006.01)
*E21B 7/00* (2006.01)
*E21B 43/34* (2006.01)
*E21B 43/01* (2006.01)

(52) U.S. Cl.
CPC .............. *E21B 43/16* (2013.01); *E21B 43/24* (2013.01); *E21B 43/34* (2013.01); *E21B 2043/0115* (2013.01)

(56) References Cited

OTHER PUBLICATIONS

Ning, et al., "The Experimental System of Gas Hydrates Integrative Simulation and its Control Module", TENCON 2008, IEEE Region 10 Conference, 10.1109/TENCON.2008.4766439 (2009) (Year: 2009).*

* cited by examiner

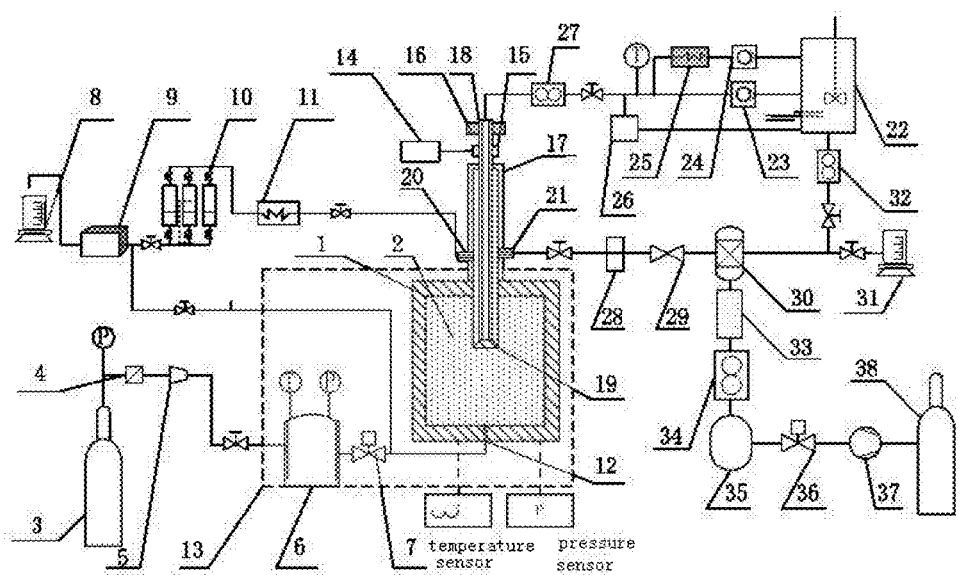

SIMULATION EXPERIMENT SYSTEM AND SIMULATION METHOD OF ENTIRE NATURAL GAS HYDRATE EXPLOITATION PROCESS

FIELD OF THE INVENTION

The present invention relates to the field of natural gas hydrate development, relates to a set of experimental device and technology for performing relevant simulation studies under different working condition environments, and particularly relates to a simulation experiment system and simulation method of an entire natural gas hydrate exploitation process, which are specifically suitable for natural gas hydrate accumulation simulation, high pressure hydrate formation drilling simulation, exploitation process simulation of a variety of methods and gas separation and collection at a later period of exploitation.

BACKGROUND OF THE INVENTION

A natural gas hydrate has the advantages of large reserves, wide distribution, high energy density, cleanness, environmental friendliness and the like, over the past decade, basic researches on the natural gas hydrate have been greatly developed, and abundant natural gas hydrate distribution has been found in seabed sediments and permafrost zones around the world. If the natural gas hydrate can be scientifically and reasonably developed and utilized, great strategic significance is played for perfecting the energy structure, protecting the environment and promoting the economic and social sustainable development.

Natural gas hydrate reservoir is characterized by low permeability, deep buried depth, complex gas components, etc. Meanwhile, hydrate development is closely related to deepwater technology, only a few countries in the world master this technology at present, the development and simulation research on the natural gas hydrate are bound to actively promote the rapid development of deepwater technology from the side and play an important role in the development of such resources as deepwater oil and gas and the like. Due to the invisibility and complexity of the hydrate exploitation process, only a comprehensive effect of multiple process parameters can be tested by an exploitation field test in general, and moreover, underground formation parameters cannot be directly measured at present. Therefore, the field test is not a completely ideal, economical and scientific test method. Description on the natural gas hydrate reservoir only involves such aspects as hydrate occurrence, reserve estimation and the like, but quantitatively accurate description still cannot be achieved; proposed exploitation modes of the natural gas hydrate reservoir are basically laboratory simulation, and understandings on exploitation mechanisms and dynamic exploitation conditions are rather superficial. Based on such special characteristics of the natural gas hydrate as lower temperature, higher pressure, complicated decomposition phase change process and the like, the exploitation of the natural gas hydrate is greatly different from the traditional oil and gas exploitation, has greater technical difficulty, and involves in situ synthesis and precise description of the natural gas hydrate reservoir, drilling technology security control of hydrate bearing formation, economic and reliable hydrate exploitation technology and treatment and collection of produced gas and water. These processes are inseparable important parts of developing secure and efficient hydrate exploitation technology and are a continuous process. The existing natural gas hydrate experimental simulation device mainly involves two aspects of accumulation and decomposition of the hydrate and lacks researches on the aspects of drilling process and produced gas collection. Meanwhile, the in situ hydrate synthesis, the drilling process, the exploitation process and the produced gas collection process of the hydrate are a continuous and inseparable process in a natural gas hydrate exploitation simulation process, so that if these processes are simply separated for single researches, the research requirements of developing an economical and efficient hydrate exploitation technology are hard to satisfy.

SUMMARY OF THE INVENTION

Aiming at the above-mentioned deficiencies, one object of the present invention is to provide a simulation device of an entire natural gas hydrate exploitation process, which can truly simulate the external environment and continuously and integrally simulate the four processes of hydrate accumulation, hydrate formation drilling, hydrate exploitation and exploited gas collection, so as to comprehensively evaluate the exploitation process and the exploitation effect more truly and provide guidance for natural gas hydrate exploitation.

To fulfill the above-mentioned object, the present invention adopts the following solutions:

a simulation device of an entire natural gas hydrate exploitation process is provided, wherein the simulation system of the natural gas hydrate exploitation process includes a hydrate accumulation simulation subsystem, a hydrate formation drilling simulation subsystem, a hydrate exploitation simulation subsystem and a produced gas collecting and processing simulation subsystem, which are used for respectively simulating a hydrate accumulation process, a hydrate formation drilling process, a hydrate decomposition and gas production process and a produced gas collecting and processing process.

The hydrate accumulation simulation subsystem includes a high pressure reaction kettle, a hydrate rock core, a first high pressure gas cylinder, a pressure reducing valve, a filter, a balance kettle, a first pressure control valve, a first electronic balance, a constant-flux pump and constant temperature water bath, wherein the first high pressure gas cylinder is connected to a gas-liquid inlet through the pressure reducing valve, the filter, the balance kettle and the first pressure control valve in sequence, a first liquid storage tank used for storing deionized water is placed in the first electronic balance, the first liquid storage tank is connected to the gas-liquid inlet through the constant-flux pump, a first stop valve is arranged between the gas-liquid inlet and the constant-flux pump, and the balance kettle and the high pressure reaction kettle are placed in the constant temperature water bath.

The hydrate formation drilling simulation subsystem includes a servo motor, a connecting gear, a hydraulic pump, a drilling column, a drill pipe, a drill bit, a mining fluid inlet, a gas-liquid outlet, a mud tank, a first mud pump, a second mud pump, a heater, an overflow valve, a drilling fluid flowmeter and a liquid flowmeter, wherein:

the drilling column is fixed at the upper side of the high pressure reaction kettle, the drill pipe is inserted in the drilling column and extends into the high pressure reaction kettle, and the drill bit is located at the bottom of the drill pipe;

the servo motor drives the connecting gear engaged with the drill pipe to rotate so as to drive the drill pipe to rotate;

the hydraulic pump is connected to the drill pipe to provide a necessary downward pressure for the drill pipe;

the mining fluid inlet and the gas-liquid outlet are located on both sides of the drilling column;

the inlet pipelines of the first mud pump and the second mud pump are connected with the mud tank, the outlet pipeline of the second mud pump is connected with the heater, the outlet pipeline of the first mud pump is jointed with the outlet pipeline of the heater through a tee joint, and a temperature sensor is arranged at the outlet of the tee joint for measuring the mud temperature; the mixed mud is divided by the tee joint into two paths after being connected, one path is connected with a mud inlet by the drilling fluid flowmeter through a pipeline, and the other path is connected with the mud tank through the overflow valve; the mud tank is provided with a mud cooling device and a stirring device. In an experiment, the second mud pump is started at first to provide two parameters of mud input pressure and mud flow; and then the openness of the overflow valve is adjusted to control and simulate a bottom hole pressure value. Drilling fluid is injected into the drill pipe via the first mud pump and the second mud pump, flows out from the drill bit and flows out from a mud outlet in an annular space between the drill pipe and a drill hole, the drilling fluid returns to the mud tank after being processed by a high pressure sand remover, a back pressure valve and a gas-liquid separator and metered by the liquid flowmeter, and a gas produced in a drilling process is metered by a gas flowmeter. In the experiment process, the mud flow is controlled by the first mud pump and the overflow valve, and the mud temperature is controlled by the second mud pump and the heater.

The hydrate exploitation simulation subsystem is mainly composed of a piston container, a heating tank, a back pressure valve, a gas-liquid separator, a second liquid storage tank and a second electronic balance. The inlet of the piston container is connected with the constant-flux pump, the outlet of the piston container is connected with the heating tank and the mining liquid inlet of the high pressure reaction kettle through a pipeline, and a second stop valve is arranged between the mining liquid inlet and the heating tank, wherein the gas-liquid outlet is arranged on the drilling column and is communicated with the drill bit, the inlet of the back pressure valve is connected with the gas-liquid outlet through a pipeline, the outlet of the back pressure valve is connected to the inlet of the gas-liquid separator, the gas outlet side of the gas-liquid separator is connected to the produced gas collecting and processing simulation subsystem, the liquid outlet side of the gas-liquid separator is communicated with the second liquid storage tank placed on the second electronic balance, and a third stop valve is arranged between the gas-liquid separator and the second liquid storage tank.

The produced gas collecting and processing simulation subsystem includes a drier, a gas flowmeter, a gas storage tank, a second pressure control valve, a booster pump and a second high pressure gas cylinder, wherein the gas outlet side of the gas-liquid separator is connected to the second high pressure gas cylinder through the dryer, the gas storage tank, the second pressure control valve and the booster pump in sequence, and the gas flowmeter is arranged on the pipeline between the dryer and the gas storage tank.

A temperature sensor and a pressure sensor are arranged in the high pressure reaction kettle.

Another object of the present invention is to provide an experimental method for simulating an entire natural gas hydrate exploitation process, which is used for continuously and integrally simulating four processes of hydrate accumulation, hydrate formation drilling, hydrate exploitation and exploited gas collection, so as to comprehensively evaluate the exploitation process and the exploitation effect more truly and provide guidance for natural gas hydrate exploitation.

To fulfill the above-mentioned object, the present invention adopts the following solutions:

an experimental method for simulating an entire natural gas hydrate exploitation process, including the following steps:

a. simulating a natural gas hydrate accumulation process: at first, filling the hydrate rock core into the high pressure reaction kettle, injecting a gas into the high pressure reaction kettle through the first high pressure gas cylinder, and checking the gas tightness of the system; then, injecting deionized water into the high pressure reaction kettle through the constant-flux pump; injecting the gas into the balance kettle through the first high pressure gas cylinder, then injecting the gas into the high pressure reaction kettle through the first pressure control valve to achieve a preset generation pressure, meanwhile setting the temperature of the constant temperature water bath to reach a preset generation temperature to start forming the hydrate, obtaining the amount of the injected gas via the pressure change of the balance kettle, and observing the generation speed and the generation process of the hydrate via changes of the temperature and the pressure in the high pressure reaction kettle;

b. simulating a hydrate formation drilling process: maintaining the temperature in the high pressure reaction kettle unchanged, starting the mud pumps at first to provide two parameters of mud input pressure and mud flow; then adjusting the openness of the overflow valve to control and simulate a bottom hole pressure value. Drilling fluid is injected into the drill pipe via the first mud pump and the second mud pump, flows out from the drill bit and flows out from the mud outlet in an annular space between the drill pipe and a drill hole, the drilling fluid returns to the mud tank after being processed by the high pressure sand remover, the back pressure valve and the gas-liquid separator and metered by the liquid flowmeter, and a gas produced in a drilling process is metered by the gas flowmeter. In the experiment process, controlling mud flow by using the first mud pump and the overflow valve, and controlling the mud temperature by using the second mud pump and the heater; setting the pressure of the hydraulic pump to provide a necessary downward drilling pressure for the drill pipe, starting the servo motor, setting a drilling speed and driving the drill pipe and the drill bit to rotate, in order to achieve a rotary drilling process;

c. simulating a hydrate exploitation process: when the drill bit drills to a certain depth in the rock core, stopping the servo motor and the mud pumps, reducing the pressure of the hydraulic pump, lifting up the drill bit and the drill pipe, and controlling the pressure of the back pressure valve to a preset hydrate exploitation pressure; when adopting a pressure reducing method to exploit the hydrate, controlling the pressure of the back pressure valve to be lower than a hydrate decomposition pressure to decompose the hydrate; when adopting a heat injection or chemical agent injection exploitation manner, injecting an aqueous solution or a chemical agent into the drill hole produced in the drilling process through the constant-flux pump, the piston container, the heating tank and the mining liquid inlet; the hydrate in the hydrate rock core starts to decompose, driving the gas-water mixture generated by decomposition to flow by the gas-liquid outlet and the back pressure valve, separating the gas-water mixture by using the gas-liquid separator, measuring the produced composed water via the second electronic balance, and metering the produced gas via the gas flowmeter;

d. simulating a produced gas collection process: firstly drying the gas produced in the hydrate exploitation process through the dryer, then injecting the gas into the gas storage tank through the gas flowmeter, when the pressure in the gas storage tank reaches a set pressure, opening the second pressure control valve connected with the gas storage tank, meanwhile starting the booster pump to inject the pressure in the gas storage tank into the second high pressure gas cylinder by pressurization, and when the pressure in the gas storage tank is lower than the set pressure, closing the second pressure control valve; weighing a drying agent in the dryer for analyzing the water content of the produced gas after the experiment;

f. when no gas is produced from the gas-liquid outlet, heating up the constant temperature water bath to completely decompose the hydrate in the high pressure reaction kettle, and collecting the rest gas in the second high pressure gas cylinder through a produced gas collection subsystem.

The hydrate rock core is an artificial or natural rock core with porosity.

To sum up, the present invention has the advantages that: the experimental device in the present invention can truly simulate the external environment and continuously and integrally simulate the four processes of hydrate accumulation, hydrate formation drilling, hydrate exploitation and exploited gas collection, so as to comprehensively evaluate the exploitation process and the exploitation effect more truly and provide guidance for natural gas hydrate exploitation. The experiment process of the simulation system is simple and feasible, and the simulation processes have strong operability and practical values.

BRIEF DESCRIPTION OF THE DRAWINGS

FIG. 1 is a schematic diagram of a structure of an embodiment of the present invention.

REFERENCE NUMERALS 1. high pressure reaction kettle; 2. hydrate rock core; 3. first high pressure gas cylinder; 4. pressure reducing valve; 5. filter; 6. balance kettle; 7. first pressure control valve; 8. first electronic balance; 9. constant-flux pump; 10. piston container; 11. heating tank; 12. gas-liquid inlet; 13. constant temperature water bath; 14. servo motor; 15. connecting gear; 16. hydraulic pump; 17. drilling column; 18 drill pipe; 19. drill bit; 20. mining liquid inlet; 21. gas-liquid outlet; 22. mud tank; 23. first mud pump; 24. second mud pump; 25. heater; 26. overflow valve; 27. drilling liquid flowmeter; 28. high pressure sand remover; 29. back pressure valve; 30. gas-liquid separator; 31. second electronic balance; 32. liquid flowmeter; 33. dryer; 34. gas flowmeter; 35. gas storage tank; 36. second pressure control valve; 37. booster pump; 38. second high pressure gas cylinder.

DETAILED DESCRIPTION OF THE EMBODIMENTS

To better understand the present invention, a further description of the present invention will be given below in combination with the accompanying drawings, but the embodiment of the present invention is not limited thereto.

Embodiment

The structure diagram of a simulation device of an entire natural gas hydrate exploitation process in the present invention is as shown in FIG. 1, and the simulation device includes a hydrate accumulation simulation subsystem, a hydrate formation drilling simulation subsystem, a hydrate exploitation simulation subsystem and a produced gas collecting and processing simulation subsystem, which can be used for simulating a hydrate formation process, a hydrate formation drilling process, a hydrate decomposition and gas production process and a produced gas collecting and processing process.

The hydrate accumulation simulation subsystem is mainly composed of a high pressure reaction kettle 1, a hydrate rock core 2, a first high pressure gas cylinder 3, a pressure reducing valve 4, a filter 5, a balance kettle 6, a first pressure control valve 7, a first electronic balance 8, a constant-flux pump 9 and constant temperature water bath 13. The constant-flux pump 9, the first high pressure gas cylinder 3, the pressure reducing valve 4, the filter 5, the balance kettle 6 and the first pressure control valve 7 are connected to a gas-liquid inlet 12 of the high pressure reaction kettle 1 through a pipeline and a stop valve; a temperature sensor and a pressure sensor are arranged in the high pressure reaction kettle 1 and are placed in the constant temperature water bath 13.

The hydrate formation drilling simulation subsystem is mainly composed a servo motor 14, a connecting gear 15, a hydraulic pump 16, a drilling column 17, a drill pipe 18, a drill bit 19, a mining fluid inlet 20, a gas-liquid outlet 21, a mud tank 22, a first mud pump 23, a second mud pump 24, a heater 25, an overflow valve 26, a drilling fluid flowmeter 27 and a liquid flowmeter 32. The servo motor 14 and the connecting gear 15 are combined to provide rotating power for the drill pipe 18. The hydraulic pump 16 provides a necessary downward pressure in a drilling process. The inlet pipelines of the first mud pump 23 and the second mud pump 24 are connected with the mud tank 22, and the outlet pipeline of the second mud pump 24 is connected with the inlet pipeline of the heater 25. A tee joint includes an inlet and two outlets, wherein the inlet joints the outlet pipeline of the second mud pump 26 and the outlet pipeline of the heater 25, namely the mud in the mud tank 22 conveyed by the first mud pump 23 and the second mud pump 24 is mixed and conveyed to the inlet of the tee joint, the mixed mud is divided by the two outlets of the tee joint into two paths, one path is connected with the drill pipe 18 by the drilling fluid flowmeter 27 through a pipeline, and the other path is connected with the mud tank 22 through the overflow valve 26. A temperature sensor is arranged at the outlet of the tee joint (of course, may also be the inlet of the tee joint) for measuring the mud temperature. The mud tank 22 is provided with a mud cooling device and a stirring device. In an experiment, the first mud pump 23 is started at first to provide two parameters of mud input pressure and mud flow; and then the openness of the overflow valve 26 is adjusted to control and simulate a bottom hole pressure value. Drilling fluid is injected into the drill pipe 18 via the first mud pump 23 and the second mud pump 24, flows out from the drill bit 19 and flows out from the gas-liquid outlet 21 in an annular space between the drill pipe 18 and a drill hole, the drilling fluid returns to the mud tank after being processed by a high pressure sand remover 28, a back pressure valve 29 and a gas-liquid separator 30 and metered by the liquid flowmeter 32, and a gas produced in a drilling process is metered by a gas flowmeter 34. In the experiment process, the mud flow is controlled by the first mud pump 23 and the overflow valve, and the mud temperature is controlled by the second mud pump 24 and the heater 25.

The hydrate exploitation simulation subsystem is mainly composed of a piston container 10, a heating tank 11, the high pressure sand remover 28, the back pressure valve 29, the gas-liquid separator 30 and a second electronic balance 31. The inlet of the piston container 10 is connected with the constant-flux pump 9, the outlet of the piston container is connected with the heating tank 11, the stop valve and the mining liquid inlet 20 of the high pressure reaction kettle 1 through a pipeline; the gas-liquid separator 30 is connected with the gas-liquid outlet 21 of the high pressure reaction kettle 1 through a pipeline and the stop valve, and the second electronic balance 31 is used for measuring the weight of liquid separated by the gas-liquid separator 30.

The produced gas collecting and processing simulation subsystem is mainly composed of a drier 33, the gas flowmeter 34, a gas storage tank 35, a second pressure control valve 36, a booster pump 37 and a second high pressure gas cylinder 38. The outlet of the gas-liquid separator 30 is sequentially connected with the dryer 33, the gas flowmeter 34, the gas storage tank 35, the second pressure control valve 36, the booster pump 37 and the second high pressure gas cylinder 38 through the pipeline and the stop valve.

The specific processes of the experimental method for simulating the natural gas hydrate exploitation process in the present invention are as follows:

a. simulating a natural gas hydrate accumulation process: at first, filling an artificial or natural hydrate rock core with certain porosity into the high pressure reaction kettle 1, and connecting the parts and the pipelines of the system; injecting a gas with a certain pressure into the high pressure reaction kettle 1 through the first high pressure gas cylinder 3, and checking the gas tightness of the system; then, injecting a certain amount of deionized water into the high pressure reaction kettle 1 through the constant-flux pump 9 to make the hydrate rock core 2 reach a certain water content; injecting the gas with certain pressure into the balance kettle 6 through the first high pressure gas cylinder 3, then injecting the gas into the high pressure reaction kettle 1 through the first pressure control valve 7 to achieve a preset generation pressure, meanwhile setting the temperature of the constant temperature water bath 13 to reach a preset generation temperature to start forming the hydrate; obtaining the amount of the injected gas via the pressure change of the balance kettle 6, and observing the generation speed and the generation process of the hydrate via changes of the temperature and the pressure in the high pressure reaction kettle 1;

b. simulating a hydrate formation drilling process: maintaining the temperature in the high pressure reaction kettle 1 unchanged, starting the first mud pump 23 at first to provide two parameters of mud input pressure and mud flow; then adjusting the openness of the overflow valve 26 to control and simulate a bottom hole pressure value. Drilling fluid is injected into the drill pipe 18 via the first mud pump 23 and the second mud pump 24, flows out from the drill bit 19 and flows out from the gas-liquid outlet 21 in an annular space between the drill pipe 18 and a drill hole, the drilling fluid returns to the mud tank after being processed by the high pressure sand remover 28, the back pressure valve 29 and the gas-liquid separator 30 and metered by the liquid flowmeter 32, and a gas produced in a drilling process is metered by the gas flowmeter 34. In the experiment process, controlling mud flow by using the first mud pump 23 and the overflow valve 26, and controlling the mud temperature by using the second mud pump 24 and the heater 25; setting the pressure of the hydraulic pump 16 to provide a necessary downward drilling pressure for the drill pipe 18, starting the servo motor 14, setting a drilling speed and driving the drill pipe 18 and the drill bit 19 to rotate, in order to achieve a rotary drilling process;

c. simulating a hydrate exploitation process: when the drill bit 19 drills to a certain depth in the rock core, stopping the servo motor 14, the first mud pump 23 and the second mud pump 24, reducing the pressure of the hydraulic pump 16, lifting up the drill bit 19 and the drill pipe 18, and controlling the pressure of the back pressure valve 29 to a preset hydrate exploitation pressure; when adopting a pressure reducing method to exploit the hydrate, controlling the pressure of the back pressure valve 29 to be lower than a hydrate decomposition pressure to decompose the hydrate; when adopting a heat injection or chemical agent injection exploitation manner, injecting an aqueous solution or a chemical agent into the drill hole produced in the drilling process through the constant-flux pump 9, the piston container 10, the heating tank 11 and the mining liquid inlet 20; the hydrate in the hydrate rock core 2 starts to decompose, driving the gas-water mixture generated by decomposition to flow by the gas-liquid outlet 21 and the back pressure valve 29, separating the gas-water mixture by using the gas-liquid separator 30, measuring the produced composed water via the second electronic balance 31, and metering the produced gas via the gas flowmeter 34;

d. simulating a produced gas collection process: firstly drying the gas produced in the hydrate exploitation process through the dryer 33, then injecting the gas into the gas storage tank 35 through the gas flowmeter 34, when the pressure in the gas storage tank 35 reaches a set pressure, opening the second pressure control valve 36 connected with the gas storage tank 35, meanwhile starting the booster pump 37 to inject the pressure in the gas storage tank 35 into the second high pressure gas cylinder 38 by pressurization, and when the pressure in the gas storage tank 35 is lower than the set pressure, closing the second pressure control valve 36; weighing a drying agent in the dryer 33 for analyzing the water content of the produced gas after the experiment;

f. when no gas is produced from the gas-liquid outlet, heating up the constant temperature water bath 13 to completely decompose the hydrate in the high pressure reaction kettle 1, and collecting the rest gas in the second high pressure gas cylinder 38 through a produced gas collection subsystem; taking out downhole tools and processing relevant experimental data to obtain experimental research results under different working conditions.

It should be understood that, the application of the present invention is not limited to the examples mentioned above, those of ordinary skill in the art can make improvements or variations according to the above-mentioned illustration, and all these improvements and variations shall fall within the protection scope of the appended claims of the present invention.

The invention claimed is:

1. A simulation device of a natural gas hydrate exploitation process, comprising:
 a hydrate accumulation simulation subsystem simulating a hydrate accumulation process;
 a hydrate formation drilling simulation subsystem simulating a hydrate formation drilling process;
 a hydrate exploitation simulation subsystem simulating a hydrate decomposition and gas production process; and a produced gas collecting and processing simulation subsystem simulating a produced gas collecting and processing process,
wherein the hydrate accumulation simulation subsystem comprises:
  a high pressure reaction kettle;
  a hydrate rock core;
  a first high pressure gas cylinder;
  a pressure reducing valve;
  a filter;
  a balance kettle;
  a first pressure control valve, wherein the first high pressure gas cylinder is connected to a gas-liquid inlet of the high pressure reaction kettle through the pressure reducing valve, the filter, the balance kettle and the first pressure control valve in sequence;
  a first electronic balance;
  a constant-flux pump;
  constant temperature water bath, the balance kettle and the high pressure reaction kettle being placed in the constant temperature water bath;
  a first liquid storage tank used for storing deionized water placed in the first electronic balance, the first liquid storage tank being connected to the gas-liquid inlet through the constant-flux pump; and
  a first stop valve arranged between the gas-liquid inlet and the constant-flux pump,
wherein the hydrate formation drilling simulation subsystem comprises:
  a servo motor;
  a connecting gear;
  a drilling column fixed at the upper side of the high pressure reaction kettle;
  a drill pipe inserted in the drilling column and extending into the high pressure reaction kettle, the servo motor driving the connecting gear engaged with the drill pipe to rotate so as to drive rotation of the drill pipe;
  a hydraulic pump connected to the drill pipe to provide a necessary downward pressure for the drill pipe;
  a drill bit located at the bottom of the drill pipe;
  a mining fluid inlet,
  a gas-liquid outlet, the mining fluid inlet and the gas-liquid outlet being located on opposite sides of the drilling column;
  a mud tank provided with a mud cooling device and a stirring device;
  a first mud pump,
  a second mud pump, inlet pipelines of the first mud pump and the second mud pump being connected with the mud tank;
  a heater, an outlet pipeline of the second mud pump being connected with the heater, an outlet pipeline of the first mud pump is jointed with an outlet pipeline of the heater through a tee joint, a first temperature sensor being arranged at an outlet of the tee joint for measuring a drilling fluid temperature, wherein drilling fluid from the first mud pump and the second mud pump is mixed and then divided by the tee joint into two paths;
  an overflow valve;
  a drilling fluid flowmeter; and
  a liquid flowmeter, wherein one path of the two paths for the mixed drilling fluid divided by the tee joint is connected with a mud inlet of the drill pipe by the drilling fluid flowmeter through a pipeline, and the other path of the two paths for the mixed drilling fluid divided by the tee joint is connected with the mud tank through the overflow valve,
wherein the hydrate exploitation simulation subsystem comprises:
  a piston container connected with the constant-flux pump;
  a heating tank, an outlet of the piston container being connected with the heating tank, a second stop valve, and a mining liquid inlet of the high pressure reaction kettle through a pipeline;
  a back pressure valve having an inlet connected with the gas-liquid outlet through a pipeline and an outlet connected to the inlet of the gas-liquid separator;
  a gas-liquid separator having a gas outlet side connected to the produced gas collecting and processing simulation subsystem and a liquid outlet side communicating with an inlet of a second liquid storage tank; and
  a second electronic balance the second liquid storage tank being placed on the second electronic balance, and a third stop valve is arranged between the gas-liquid separator and the second liquid storage tank, and
wherein the produced gas collecting and processing simulation subsystem comprises:
  a dryer;
  a gas flowmeter;
  a gas storage tank;
  a second pressure control valve;
  a booster pump; and
  a second high pressure gas cylinder, wherein the gas outlet side of the gas-liquid separator is connected to the second high pressure gas cylinder through the dryer, the gas storage tank, the second pressure control valve and the booster pump in sequence, and the gas flowmeter is arranged on the pipeline between the dryer and the gas storage tank.

2. The simulation device of the natural gas hydrate exploitation process of claim 1, wherein a second temperature sensor and a pressure sensor are arranged in the high pressure reaction kettle.

3. A method for simulating a natural gas hydrate exploitation process, comprising the steps of:
  a. simulating a natural gas hydrate accumulation process including:
    at first, filling a hydrate rock core into a high pressure reaction kettle, injecting a gas into the high pressure reaction kettle through a first high pressure gas cylinder, and checking a gas tightness of the system;
    then, injecting deionized water into the high pressure reaction kettle through a constant-flux pump; and
    injecting the gas into a balance kettle through the first high pressure gas cylinder, then injecting the gas into the high pressure reaction kettle through a first pressure control valve to achieve a preset generation pressure, meanwhile setting a temperature of a constant temperature water bath to reach a preset generation temperature to start forming the hydrate, obtaining the amount of the injected gas via the pressure change of the balance kettle, and determining a speed of a generation process of the hydrate based on changes of a temperature and a pressure in the high pressure reaction kettle;
  b. simulating a hydrate formation drilling process including:
    maintaining the temperature in the high pressure reaction kettle unchanged, starting a first mud pump at first to provide two parameters of drilling fluid input pressure and drilling fluid flow rate;

then adjusting an openness of an overflow valve to control and simulate a bottom hole pressure value;

injecting drilling fluid into a drill pipe via the first mud pump and a second mud pump, driving the drilling fluid to flow out from a drill bit, flow out from a gas-liquid outlet in an annular space between the drill pipe and a drill hole and return to a mud tank after being processed by a high pressure sand remover, a back pressure valve and a gas-liquid separator and metered by a liquid flowmeter, and metering a gas produced in a drilling process by using a gas flowmeter;

controlling the drilling fluid flow rate using the first mud pump and the overflow valve, and controlling a drilling fluid temperature by using the second mud pump and a heater; and setting a pressure of a hydraulic pump to provide a necessary downward drilling pressure for the drill pipe, starting a servo motor, setting a drilling speed and driving the drill pipe and the drill bit to rotate, in order to achieve a rotary drilling process;

c. simulating a hydrate exploitation process including:

when the drill bit drills to a certain depth in the rock core, stopping the servo motor, the first mud pump and the second mud pump, reducing the pressure of the hydraulic pump, lifting up the drill bit and the drill pipe, and controlling the pressure of the back pressure valve to a preset hydrate exploitation pressure;

when adopting a pressure reducing method to exploit the hydrate, controlling the pressure of the back pressure valve to be lower than a hydrate decomposition pressure to decompose the hydrate;

when adopting a heat injection or chemical agent injection exploitation manner, injecting an aqueous solution or a chemical agent into the drill hole produced in the drilling process through the constant-flux pump, a piston container, a heating tank and a mining liquid inlet; and when the hydrate in the hydrate rock core starts to decompose, driving the gas-water mixture generated by decomposition to flow by the gas-liquid outlet and the back pressure valve, separating the gas-water mixture by using the gas-liquid separator, measuring the produced composed water via a second electronic balance, and metering the produced gas via a gas flowmeter;

d. simulating a produced gas collection process including:

firstly drying the gas produced in the hydrate exploitation process through a dryer, then injecting the gas into a gas storage tank through the gas flowmeter, when the pressure in the gas storage tank reaches a set pressure, opening a second pressure control valve connected with the gas storage tank, meanwhile starting a booster pump to inject the gas in the gas storage tank into a second high pressure gas cylinder by pressurization, and when the pressure in the gas storage tank is lower than the set pressure, closing the second pressure control valve; and weighing a drying agent in the dryer for analyzing the water content of the produced gas; and e. when no gas is produced from the gas-liquid outlet, heating up the constant temperature water bath to completely decompose the hydrate in the high pressure reaction kettle, and collecting a rest gas in the second high pressure gas cylinder through the produced gas collection process.

4. The method for simulating the natural gas hydrate exploitation process of claim 3, wherein the hydrate rock core is an artificial or natural rock core with porosity.

* * * * *